(12) United States Patent
Lambkin et al.

(10) Patent No.: US 11,152,975 B2
(45) Date of Patent: Oct. 19, 2021

(54) HIGH FREQUENCY GALVANIC ISOLATORS

(71) Applicant: Analog Devices International Unlimited Company, Limerick (IE)

(72) Inventors: Paul Lambkin, Carrigaline (IE); Baoxing Chen, Westford, MA (US); Jinglin Xu, Reading, MA (US); Ramji Lakshmanan, Limerick (IE)

(73) Assignee: Analog Devices International Unlimited Company, Limerick (IE)

( * ) Notice: Subject to any disclaimer, the term of this patent is extended or adjusted under 35 U.S.C. 154(b) by 75 days.

(21) Appl. No.: 16/655,194

(22) Filed: Oct. 16, 2019

(65) Prior Publication Data

US 2021/0119670 A1   Apr. 22, 2021

(51) Int. Cl.
*H04B 5/00* (2006.01)
*H01F 19/08* (2006.01)
(Continued)

(52) U.S. Cl.
CPC ............. *H04B 5/005* (2013.01); *H01F 19/08* (2013.01); *H01F 27/40* (2013.01); *H04B 5/0087* (2013.01);
(Continued)

(58) Field of Classification Search
CPC ....... H04B 5/005; H04B 5/0087; H01F 19/08; H01F 2019/085; H04F 27/40; H04L 25/0266
See application file for complete search history.

(56) References Cited

U.S. PATENT DOCUMENTS 9,093,973 B2   7/2015   Nagai
9,224,534 B2   12/2015   Nagai et al.
(Continued)

FOREIGN PATENT DOCUMENTS

CN   2318700 Y   5/1999
CN   102958432 A   3/2013
(Continued)

OTHER PUBLICATIONS

Arif et al., Loss Optimization of Coplanar strips for CMOS RFICs. Birck and NCN Publications. Paper 550. 2009; 5 pages.
(Continued)

*Primary Examiner* — Jared Fureman
*Assistant Examiner* — Duc M Pham
(74) *Attorney, Agent, or Firm* — Wolf, Greenfield & Sacks, P.C.

(57) ABSTRACT

Isolators for high frequency signals transmitted between two circuits configured to operate at different voltage domains are provided. The isolators may include resonators capable of operating at high frequencies with high transfer efficiency, high isolation rating, and a small substrate footprint. In some embodiments, the isolators may operate at a frequency not less than 20 GHz, not less than 30 GHz, not less than 65 GHz, or between 20 GHz and 100 GHz, including any value or range of values within such range. The isolators may include inductive loops with slits and capacitors integrally formed at the slits. The sizes and shapes of the inductive loops and capacitors may be configured to control the values of equivalent inductances and capacitances of the isolators. The isolators are compatible to different fabrication processes including, for example, micro-fabrication and PCB manufacture processes.

20 Claims, 12 Drawing Sheets

(51) Int. Cl.
*H01F 27/40* (2006.01)
*H04L 25/02* (2006.01)
(52) U.S. Cl.
CPC .... *H04L 25/0266* (2013.01); *H01F 2019/085* (2013.01)

(56) References Cited

U.S. PATENT DOCUMENTS

| | | | |
|---|---|---|---|
| 9,287,910 | B2 | 3/2016 | Fujiwara et al. |
| 9,380,705 | B2 | 6/2016 | Chen |
| 9,391,353 | B2 | 7/2016 | Nagai |
| 9,640,604 | B2 | 5/2017 | Chen |
| 9,852,941 | B2 | 12/2017 | Chen |
| 9,941,565 | B2 | 4/2018 | McLoughlin et al. |
| 10,164,614 | B2 | 12/2018 | Yang et al. |
| 10,505,258 | B2 | 12/2019 | Lee et al. |
| 2010/0020448 | A1* | 1/2010 | Ng ............ H01F 19/08 361/1 |
| 2012/0189246 | A1 | 7/2012 | Hofrichter et al. |
| 2014/0262464 | A1* | 9/2014 | Chen ............ H04B 5/005 174/261 |
| 2015/0234417 | A1 | 8/2015 | Kawai et al. |
| 2015/0280785 | A1* | 10/2015 | Brauchler ...... H04B 5/0018 257/531 |
| 2016/0308402 | A1 | 10/2016 | Alavikia et al. |
| 2018/0108621 | A1 | 4/2018 | Burton et al. |
| 2018/0130867 | A1 | 5/2018 | Lambkin et al. |
| 2018/0148318 | A1 | 5/2018 | Flynn et al. |
| 2018/0240761 | A1* | 8/2018 | Burton ............ H01L 24/49 |
| 2020/0076512 | A1* | 3/2020 | O'Sullivan ...... H01F 27/2804 |
| 2021/0065955 | A1 | 3/2021 | Lambkin et al. |

FOREIGN PATENT DOCUMENTS

| | | |
|---|---|---|
| CN | 104170164 A | 11/2014 |
| CN | 103943956 B | 6/2016 |
| CN | 107591597 A | 1/2018 |
| JP | 2008-067012 A | 3/2008 |
| JP | 2016-052124 A | 4/2016 |
| KR | 101451705 B1 | 10/2014 |
| WO | WO 2014/171091 A1 | 10/2014 |
| WO | WO 2014/171125 A1 | 10/2014 |
| WO | WO 2018/021973 A2 | 2/2018 |

OTHER PUBLICATIONS

Aydin et al., Split Ring Resonator-Coupled Enhanced Transmission through a Single Subwavelength Aperture. Jan. 7, 2009; 14 pages. Retrieved from Internet: https://arxiv.org/ftp/arxiv/papers/0805/0805.3907.pdf Last accessed Dec. 16, 2019.
Bonache et al., Complementary Split Ring Resonators for Microstrip Diplexer Design. Electronics Letters. Jul. 7, 2005; 41(14): 2 pages.
Frank et al., Coupled loops at 20 GHz for stacked planar circuits. Electronics Letters. Apr. 26, 2007; 43(9):513-514.
Heebl et al., Comprehensive Analysis and Measurement of Frequency-Tuned and Impedance-Tuned Wireless Non-Radiative Power Transfer Systems. Jan. 14, 2014; Retrieved from the Internet: https://arxiv.org/pdf/1401.3324.pdf. Last accessed Dec. 16, 2019; 11 pages.
Kurs et al., Wireless Power Transfer via Strongly Coupled Magnetic Resonances. Science. Jul. 6, 2007; 317:83-86.
Li et al., Compact Microstrip Bandpass Diplexer Based on Twist Revised Split Ring Resonators. International Journal of Antennas and Propagation. Mar. 30, 2015: Article ID 69874, 6 pages.
Nadeem et al., Study on Mutual Coupling Reduction Technique for MIMO Antennas. IEEEAccess. Jan. 2018:25 pages.
Ponchak et al., Measured attenuation of coplanar waveguide on CMOS grade silicon substrates with polyimide interface layer. Electronics Letters. Jun. 25, 1998; 34(13):1327-1329.
Schurig et al., Metamaterial Electromagnetic Cloak at Microwave Frequencies. Sciencexpress. Oct. 19, 2006; 10.1126:8 pages.
Selvaraju et al., Complementary Split Ring Resonator for Isolation Enhancement in 5G Communication Antenna Array. Progress in Electromagnetics Research C. Jan. 2018;83:217-228.

* cited by examiner

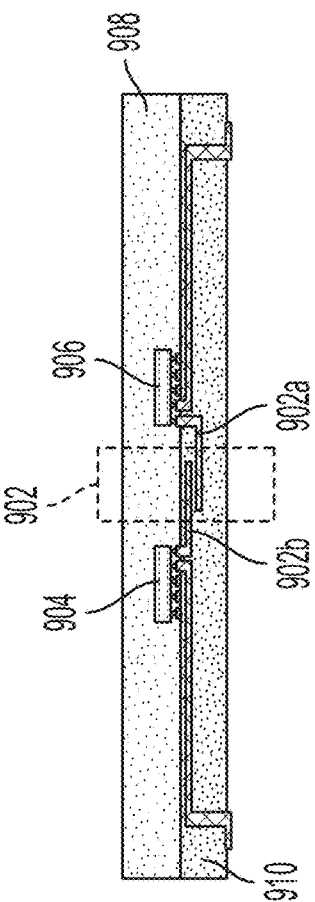
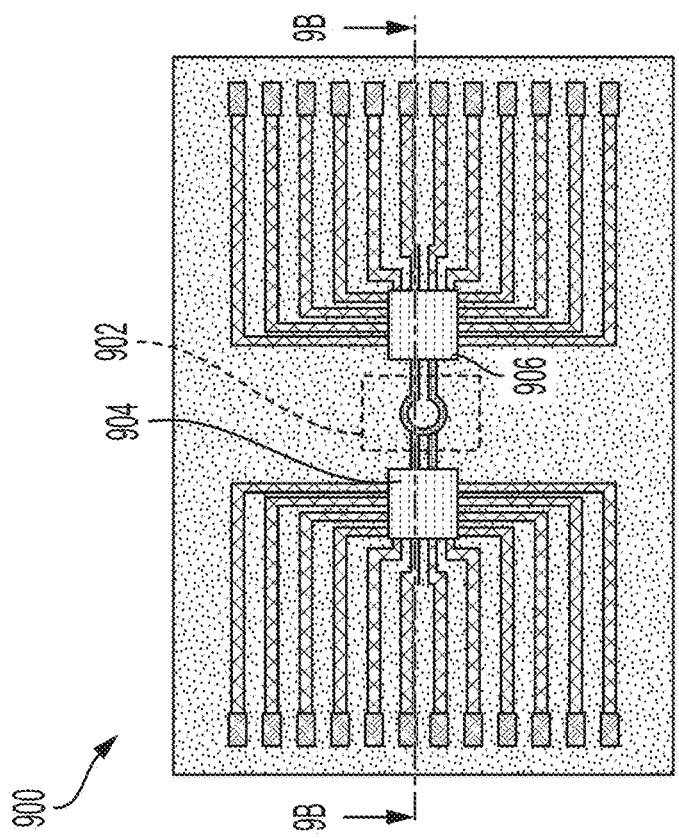
FIG. 9B
FIG. 9A

HIGH FREQUENCY GALVANIC ISOLATORS

FIELD OF THE DISCLOSURE

The present application relates to galvanic isolators providing galvanic isolation between circuits.

BACKGROUND

Isolators provide electrical isolation between circuits which communicate with each other. In some situations, circuits which communicate with each other operate at different voltages, for instance one at a relatively high voltage and the other at a relatively low voltage. In some situations, the circuits are referenced to different electrical ground potentials. Isolators can be used to electrically isolate circuits in either of these situations. Connecting multiple isolators in series may increase the amount of isolation between the circuits.

BRIEF SUMMARY

Isolators for high frequency signals transmitted between two circuits configured to operate at different voltage domains are provided. The isolators may include resonators capable of operating at high frequencies with high transfer efficiency, high isolation rating, and a small substrate footprint. In some embodiments, the isolators may operate at a frequency not less than 20 GHz, not less than 30 GHz, not less than 65 GHz, or between 20 GHz and 100 GHz, including any value or range of values within such range. The isolators may include inductive loops with slits and capacitors integrally formed at the slits. The sizes and shapes of the inductive loops and capacitors may be configured to control the values of equivalent inductances and capacitances of the isolators. The isolators are compatible to different fabrication processes including, for example, micro-fabrication and PCB manufacture processes.

Some embodiments relate to an integrated isolator device. The integrated isolator device includes a substrate, a first inductive loop on the substrate and having a first slit, a first capacitor, a second inductive loop on the substrate and having a second slit, and a second capacitor. The second inductive loop is galvanically isolated from the first inductive loop. The first capacitor includes first and second electrodes extending from the first slit. The second capacitor includes third and fourth electrodes extending from the second slit.

Some embodiments relate to an integrated isolator device. The integrated isolator device includes a substrate, first and second inductive loops on the substrate and having first and second slits respectively, a first capacitor extending from the first slit in a first direction, a second capacitor extending from the second slit in a second direction opposite to the first direction, third and fourth inductive loops on the substrate and having third and fourth slits respectively, a third capacitor extending from the third slit in the second direction, and a fourth capacitor extending from the fourth slit in the first direction. The third and fourth inductive loops are electrically coupled to each other.

Some embodiments relate to a system including an integrated device, a transmitter, and a receiver. The integrated isolator device includes a first inductive loop having a first slit, a second inductive loop having a second slit, and first and second capacitors extending from the first and second slits respectively. The second inductive loop is galvanically isolated from the first inductive loop. The transmitter is coupled to the first inductive loop and configured to operate in a first voltage domain. The receiver is coupled to the second inductive loop and configured to operate in a second voltage domain different from the first voltage domain.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings:

FIG. 9A is a top view of a system including an integrated isolator device, according to some embodiments.

FIG. 9B is a cross-sectional view of the system of FIG. 9A along a line marked 9B, according to some embodiments.

DETAILED DESCRIPTION

Figure 1:
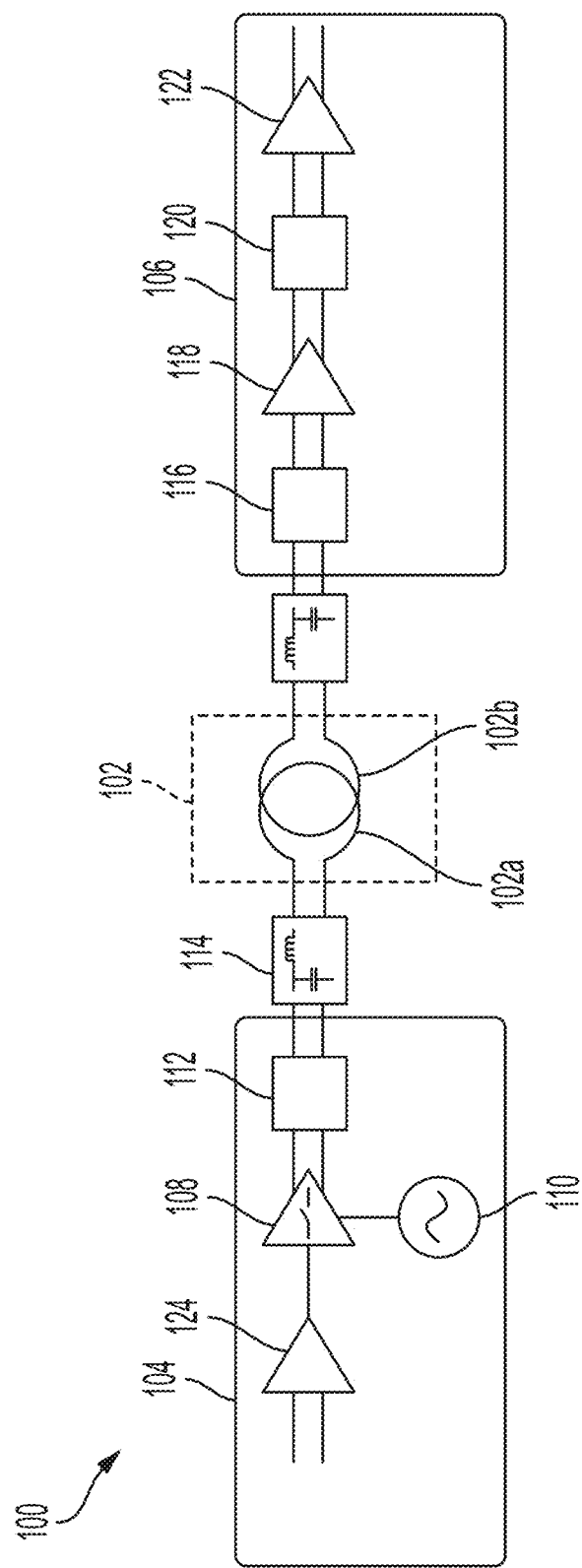
FIG. 1 is a simplified schematic of a system including an integrated isolator device, according to some embodiments.

Described herein are isolators capable of operating at high frequencies with high transfer efficiency, high isolation rating, and a small substrate footprint. In some embodiments, the isolators may operate at a frequency not less than 20 GHz, not less than 30 GHz, not less than 65 GHz, or between 20 GHz and 100 GHz, including any value or range of values within such range. In some embodiments, the isolators may have transfer efficiency between 10% and 90%, including any value or range of values within such range. In some embodiments, the isolators may have isolation rating between 100 V and 2 kV, including any value or range of values within such range. In some embodiments, the isolators may have substrate footprint between $(100\ \text{um})^2$ and $(1\ \text{cm})^2$, including any value or range of values within such range. The inventors have recognized and appreciated that conventional isolators cannot operate at such high frequencies and provide sufficient isolation and high transfer efficiency at the same time. Conventional attempts at high speed isolators include inductors (e.g., planar spiral inductors) magnetically coupled to each other by disposing the inductors closely. When frequencies for signals transmitting between two circuits at different voltage domains increase, those conventional isolators either keep a distance between the inductors small to maintain transfer efficiency but sacrifice isolation rating, or increase the distance to maintain isolation rating but sacrifice transfer efficiency.

Aspects of the present application provide isolator apparatus and methods for high frequency operation with high transfer efficiency, high isolation rating, and a small substrate footprint. In some embodiments, isolators may include isolator components tuned to operate at a same resonant frequency such that the isolator components may be separated by a larger distance, providing for high isolation rating while maintaining high transfer efficiency at high frequencies.

In some embodiments, the isolator components of an isolator may include inductive loops with slits and capacitors integrally formed at the slits such that the isolator components operate at a desired resonance frequency, which may be configured corresponding to a desired operating frequency of the isolator. In some embodiments, the inductive loops may be configured to provide both a desired equivalent inductance of the isolator components and a desired substrate footprint size. In some embodiments, the capacitors may introduce to the isolator components capacitances additional to the intrinsic internal capacitances of the inductive loops such that the isolator components operate at the desired resonance frequency. In some embodiments, the capacitors may be configured such that the equivalent capacitance of the isolator components, taking into account the intrinsic capacitance of the inductive loops, has a desired value for providing a desired resonance frequency of the isolator components.

In some embodiments, an inductive loop may include a single arc. The single arc may have a circumference substantially equal to a wavelength corresponding to the desired resonance frequency at which the isolator components operate. In some embodiments, the arc may be part of a circle. In some embodiments, an inductive loop may include first and second arcs to achieve a larger inductance than a single arc with the same substrate footprint, or a similar inductance as a single arc with smaller substrate footprint. The first and second arcs may be concentric. Each of the first and second arcs may provide an end for a slit.

In some embodiments, the capacitors of the isolator components may be formed with pairs of electrodes extending from slits of respective inductive loops of the isolator component. In some embodiments, the capacitors may be in a same metallization layer with the respective inductive loops so as to remove the need for underpass metallization to form capacitors. In some embodiments, a capacitor may extend from a slit of a respective inductive loop towards a center of the respective inductive loop. In some embodiments, a capacitor may extend from a slit of a respective inductive loop away from a center of the respective inductive loop. In some embodiments, a capacitor may include a pair of electrodes extending substantially parallel to each other. In some embodiments, a capacitor may include a pair of electrodes interleaved with each other to, for example, achieve a larger capacitance than a pair of parallel electrodes with the same substrate footprint, or a similar capacitance as a pair of parallel electrodes with smaller substrate footprint.

In some embodiments, a system may include circuits operating at different voltage domains. In some embodiments, the voltage difference between the different voltage domains may be higher than 400 V, higher than 600 V, or higher than 2 kV. The system may include an isolator to provide galvanic isolation between the circuits operating at the different voltage domains. The isolator may also be configured to withstand electrical surge events, for example, in the range of 10 kV to 20 kV.

FIG. 1 depicts such a system 100 including an integrated isolator device 102, according to some embodiments. The integrated isolator device 102 may provide galvanic isolation between a transmitter 104 and a receiver 106, which may operate at different voltage domains corresponding to, for example, different supply voltages and/or different reference voltages.

The transmitter 104 may receive signals in various formats, for example, digital data with on-off keying (OOK) modulation. The transmitter 104 may include an input buffer 124 to timely provide the received signals to a driver/mixer 108. The driver/mixer 108 may be configured to tune the frequency of the received signals based, at least in part, on a clock signal (e.g., 30 GHz) from a voltage-controlled oscillator (VCO) 110. The transmitter 104 may include a matching network (MN) 112 configured to match the output impedance of the transmitter 104 with the input impedance of the integrated isolator device 102. The matching network 112 may be configured to account for parasitics 114 caused by, for example, input pads and interconnections between the transmitter 104 and the integrated isolator device 102. The matching network 112 may be configured to provide a reasonable quality factor (Q) of a first isolator component 102a coupled to the transmitter 104 to yield a flat passband, which may reduce jitter.

The integrated isolator device 102 may include the first isolator component 102a coupled to the transmitter 104 and a second isolator component 102b coupled to the receiver 106. The first and second isolator components 102a and 102b may be galvanically isolated from and inductively coupled to each other. The first and second isolator components 102a and 102b may be positioned to overlap, at least partially, with each other such that one of the isolator components can induce magnetic flux from the other one. The first and second isolator components 102a and 102b may be configured to have a same resonance frequency such that the isolator components can operate in resonance and have high transfer efficiency between each other at high frequencies.

The receiver 106 may receive signals through the second isolator component 102b. The receiver 106 may include a matching network (MN) 116 configured to match the output impedance of the integrated isolator device 102 with the input impedance of a low noise amplifier (LNA) 118. The matching network 116 may also be configured to account for parasitics. The matching network 116 may be configured to provide a reasonable Q factor of the second isolator component 102b coupled to the receiver 106. The LNA 118 may be AC coupled to a demodulator 120. The receiver 106 may output data through an output buffer 122.

Figure 2:
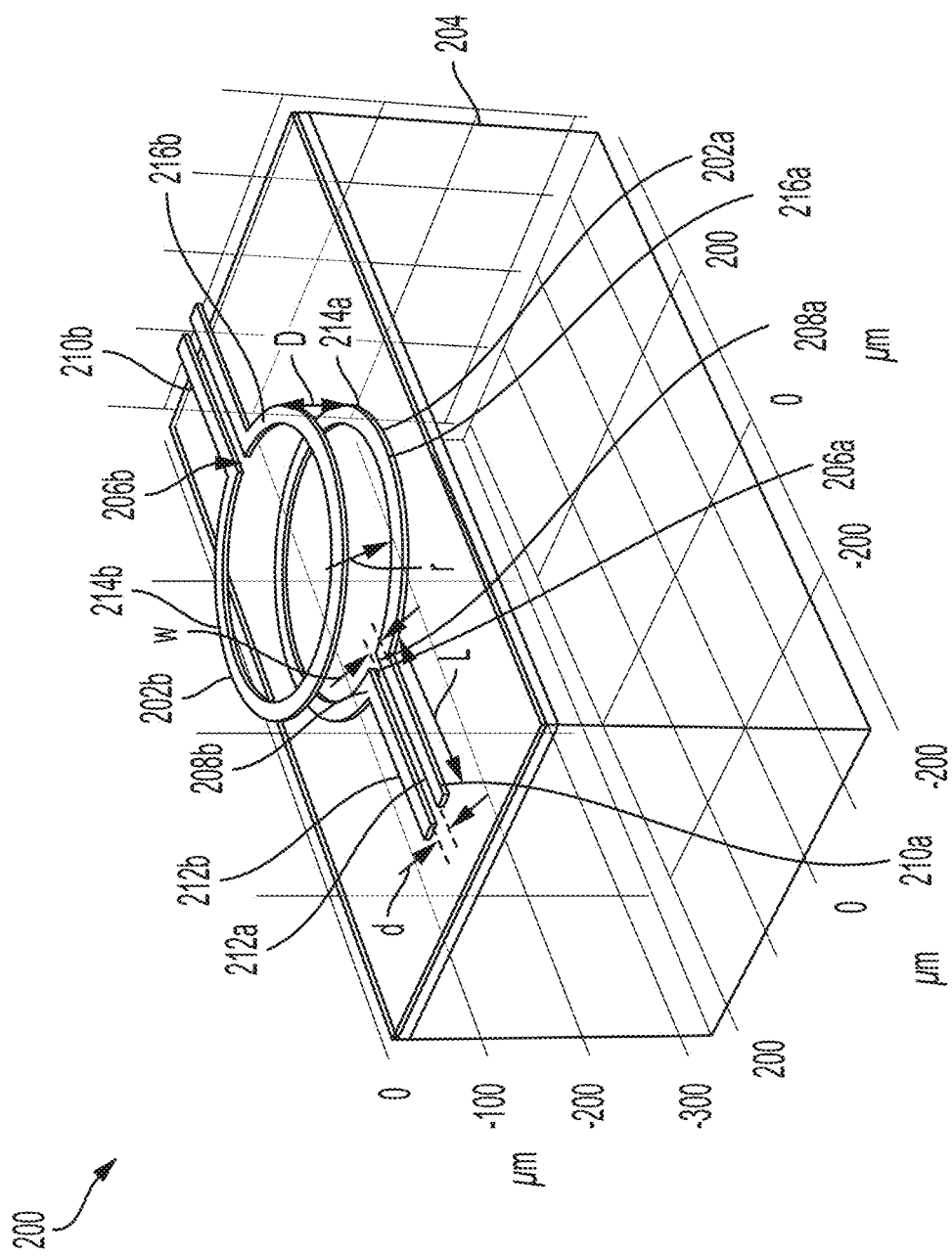
FIG. 2 is a simplified perspective view of an integrated isolator device, according to some embodiments.

In some embodiments, an integrated isolator device may include isolator components stacked vertically. FIG. 2 depicts an integrated isolator device 200 with a first isolator component 214a and a second isolator component 214b, stacked vertically on a substrate 204, according to some embodiments. The first isolator component 214a and the second isolator component 214b may be galvanically isolated from each other by a distance D. The distance D may be selected such that the transfer efficiency between the first and second isolator components is sufficiently efficient, for example, no more than 3 dB loss across an operating bandwidth of the integrated isolator device 200. The distance D may also be selected such that the integrated isolator device 200 can withstand high voltage differences and surge events. In some embodiments, the distance D may be in the range of 20 µm to 500 µm, in the range of 50 µm to 300 µm, or in the range of 50 µm to 100 µm.

The first isolator component 214a may include a first inductive loop 202a and a first capacitor 210a. The first inductive loop 202a may include an arc 216a extending from a first end 208a to a second end 208b. The arc 216a may be part of a circle that has a radius r. The inductive loop 202a may include a slit 206 between the first end 208a and the second end 208b that are separated from each other by the slit's width w. In some embodiments, the radius r and width w may be selected such that a circumference of the arc 216a substantially equals to a wavelength of a desired resonance frequency of the first isolator component 214. In some embodiments, the slit's width w may be selected to form the capacitor 210a integrally from the slit 206a, providing, for example, a desired equivalent inductance of the arc. In some embodiments, the radius r may be in the range of 200 µm to 600 µm for the first isolator component 214a to have a high resonance frequency. In some embodiments, the slit's width w may be in the range of 2 µm to 20 µm.

The first capacitor 210a may include a first electrode 212a extending from the first end 208a and a second electrode 212b extending from the second end 208b. The first and second electrodes 212a and 212b may extend substantially in parallel to each other. A distance d between the first and second electrodes 212a and 212b may substantially equal to the slit's width w. It should be appreciated that the selection of the slit's width w may affect a capacitance provided by the capacitor integrally formed at the slit. The first and second electrodes 212a and 212b may extend for a length L that is selected to provide a capacitance for the first isolator component 214a to have the desired resonance frequency. Although the first and second electrodes 212a and 212b extend away from the respective slit 206a in the illustrated example, it should be appreciated that the electrodes may extend into the arc 216a in some embodiments. Although the first and second electrodes 212a and 212b extend substantially perpendicular to a tangent of the arc 216a at the slit 206a in the illustrated example, it should be appreciated that the electrodes may extend in any suitable directions, for example, extending in an angle to the tangent of the arc 216a at the slit 206a so as to achieve a compact substrate footprint.

Figure 3B:
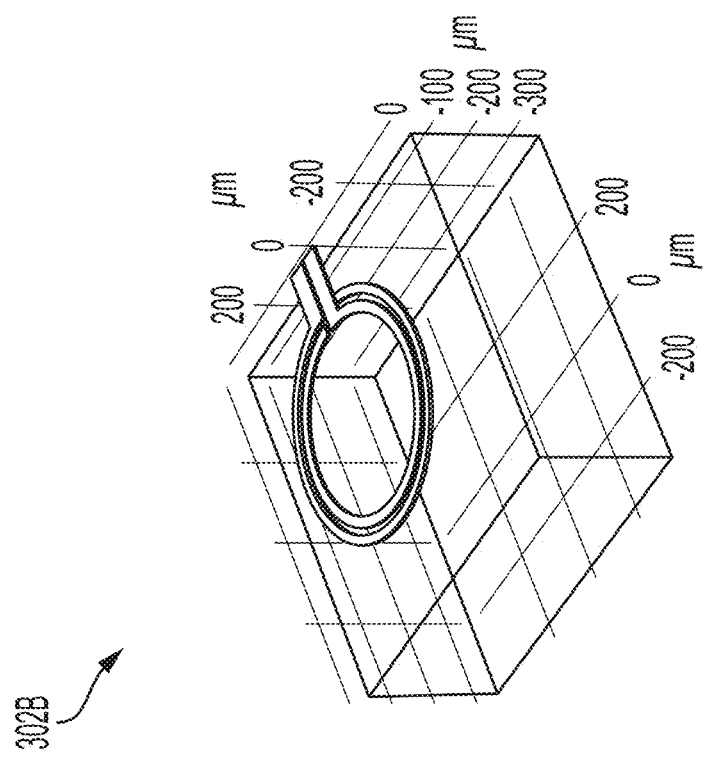
FIG. 3B is a simplified perspective view of an alternative inductive loop of the integrated isolator device of FIG. 2, according to some embodiments.
Figure 3A:
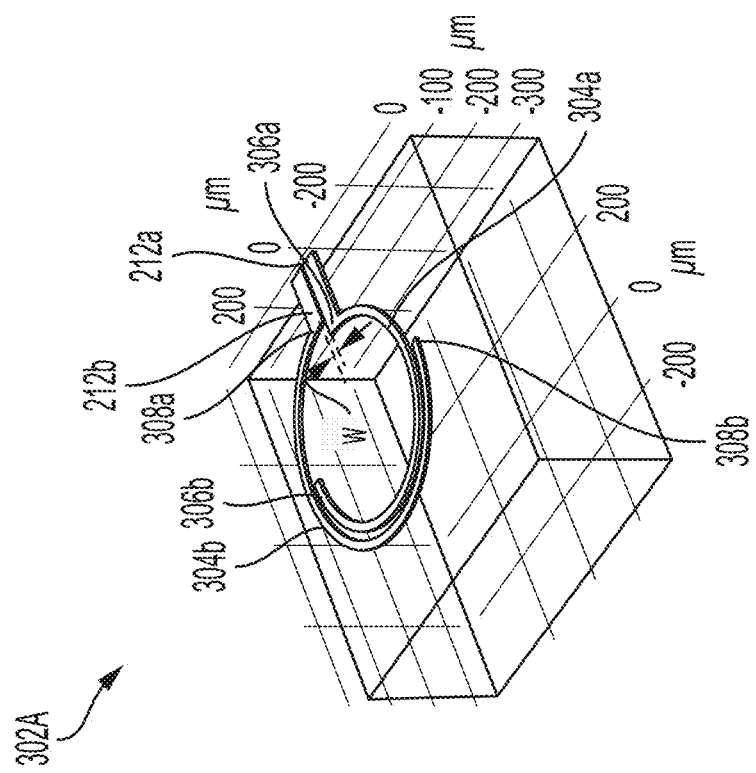
FIG. 3A is a simplified perspective view of an alternative inductive loop of the integrated isolator device of FIG. 2, according to some embodiments.

The first inductive loop 202a may include more than the single arc 216a shown in FIG. 2. FIG. 3A and FIG. 3B depict alternative inductive loops 302A and 302B for the first isolator component 214a of the integrated isolator device 200, according to some embodiments. The inductive loop 302A may include a first arc 304a and a second arc 304b. In some embodiments, the first arc 304a and the second arc 304b may be concentric. The first arc 304a may extend from a first end 306a to a second end 306b. The second arc 304b may extend from a third end 308a to a fourth end 308b. The slit's width w may be defined by the first end 306a and the third end 308a. In some embodiments, the second end 306b may be separated from the first end 306a by a distance greater than the slit's width w, for example, as the inductive loop 302A illustrated in FIG. 3A. In some embodiments, the second end 306b may be separated from the first 306a by a distance substantially equal to the slit's width w, for example, as the inductive loop 302B illustrated in FIG. 3B. The inductive loops 302A and 302B may provide a same equivalent inductance as the inductive loop 202a illustrated in FIG. 2 with a more compact substrate footprint. The inductive loops 302A and 302B may provide a larger equivalent capacitance than the inductive loop 202 illustrated in FIG. 2 with the single arc 216a such that the length L of the electrodes 212a and 212b may be reduced, saving substrate footprint.

Figure 4:
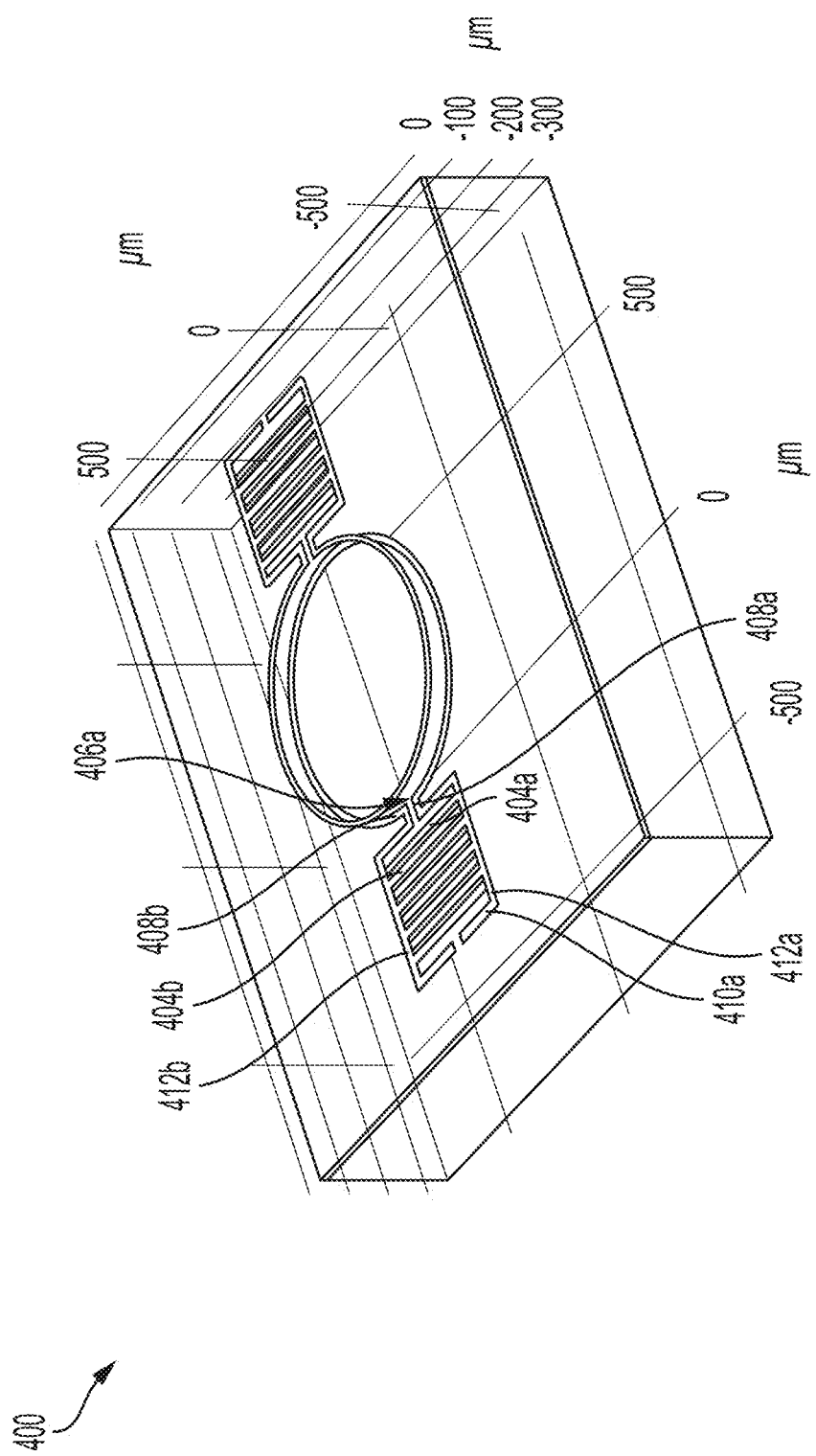
FIG. 4 is a simplified perspective view of an integrated isolator device, according to some embodiments.

The first capacitor 210a may be sized and shaped differently from the parallel capacitor shown in FIG. 2. FIG. 4 depicts an alternative capacitor 410a for the first isolator component 214a of the integrated isolator device 200, according to some embodiments. The capacitor 410a may include a first electrode 412a extending from a first end 408a of a slit 406a. The capacitor 410a may include a second electrode 412b extending from a second end 408b of the slit 406a. The first and second electrodes 412a and 412b may be interleaved with each other. In the illustrated example, the first and second electrodes 412a and 412b have fingers 404a and 404b respectively. The fingers 404a and 404b are disposed alternatively in a direction perpendicular to a length of the fingers. The capacitor 410a may provide a same capacitance as the first capacitor 210a (FIG. 2) with a more compact substrate footprint.

Referring back to FIG. 2, the second isolator component 214b may include a second inductive loop 202b and a second capacitor 210b. The second inductive loop 202b may include a second arc 216b and a second slit 206b. In some embodiments, the second arc 216b may at least partially overlap with the first arc 216a of the first isolator component 214a such that the first and second isolator components 214a and 214b may be inductively coupled to each other. In some embodiments, the second capacitor 210b may extending in a direction opposite to a direction that the first capacitor 210a extends. Although the second isolator component 214b is shaped as turning the first isolator component 214a by 180 degrees clockwise in the illustrated example, it should be appreciated that the second isolator component 214b may be shaped and sized differently from the first isolator component 214a.

Figure 5:
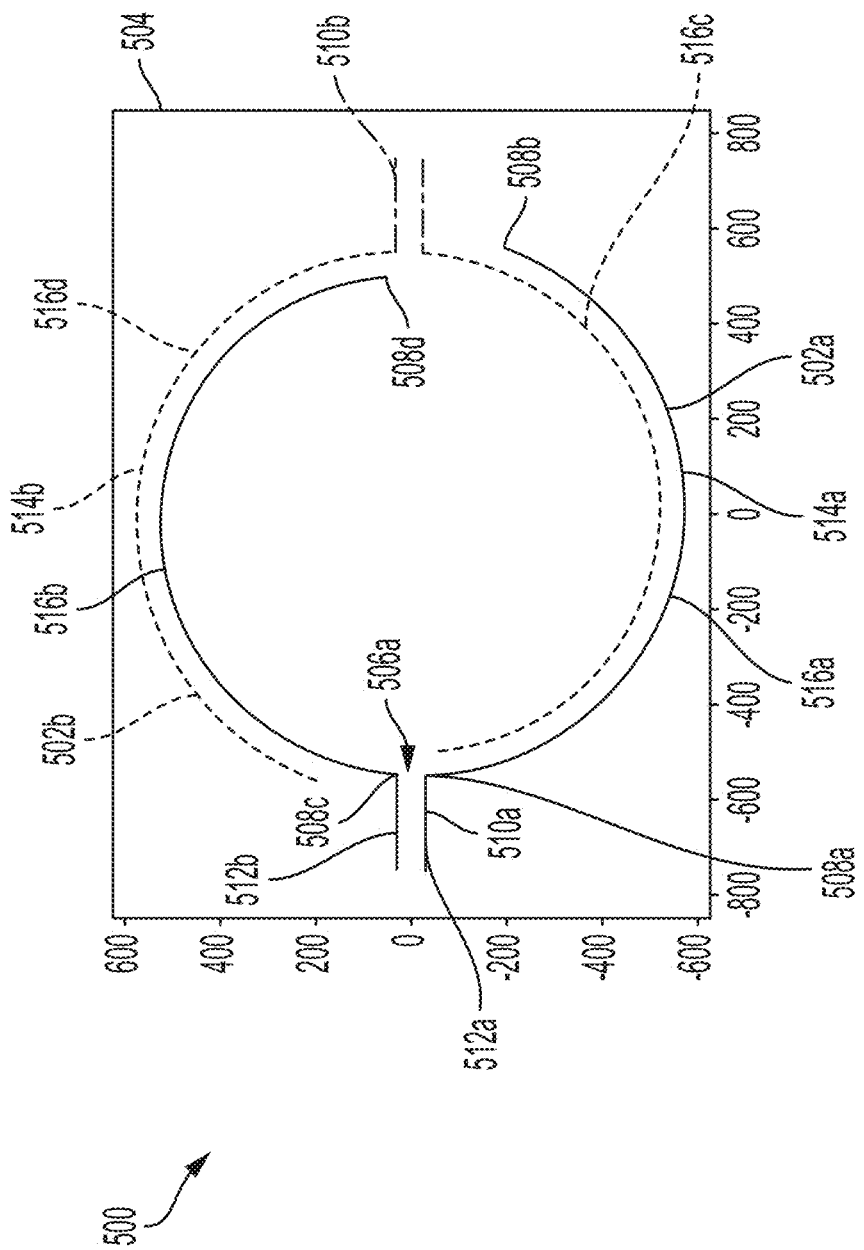
FIG. 5 is a simplified top view of an integrated isolator device, according to some embodiments.

In some embodiments, an integrated isolator device may include isolator components disposed in a same plane, which enables fabrication of the integrated isolator device with a single metallization layer. FIG. 5 depicts a top view of an integrated isolator device 500 with a first isolator component 514a and a second isolator component 514b, disposed in a same plane on a substrate 504, according to some embodiments. The first isolator component 514a may include a first inductive loop 502a and a first capacitor 510a. The first inductive loop 502a may include a first arc 516a extending from a first end 508a to a second end 508b. The first inductive loop 502a may include a second arc 516b extending from a third end 508c to a fourth end 508d. The first end 508a and the third end 508c may define a slit 506a. The first capacitor 510a may include a first electrode 512 extending from the first end 508a and a second electrode 512b extending from the third end 508c. The second isolator component 514b may include a second inductive loop 502b and a second capacitor 510b. The second inductive loop 502b may include a third arc 516c and a fourth arc 516d. The arcs 516a to 516d may be disposed alternatively in the plane.

In some embodiments, an integrated isolator device may have a back-to-back configuration. In some embodiments, an integrated isolator device with a back-to-back configuration may include a first isolator component coupled to a first circuit operating at a first voltage domain and a second isolator component coupled to a second circuit operating at a second voltage domain. The first isolator component and the second isolator component may be galvanically isolated from each other. The first isolator component and the second isolator component may be inductively coupled to each other through multiple isolator components, for example, at least two isolator components so at to achieve a higher isolation rating with the cumulative isolation properties of the at least two isolator components. The isolator components of an integrated isolator device may be configured to have a same resonant frequency such that energy relays through the multiple isolator components can maintain a high transfer efficiency, for example, less than 3 dB loss across a large operating bandwidth. FIGS. 6A-7B depict integrated isolator devices with a back-to-back configuration, according to some embodiments.

Figure 6A:
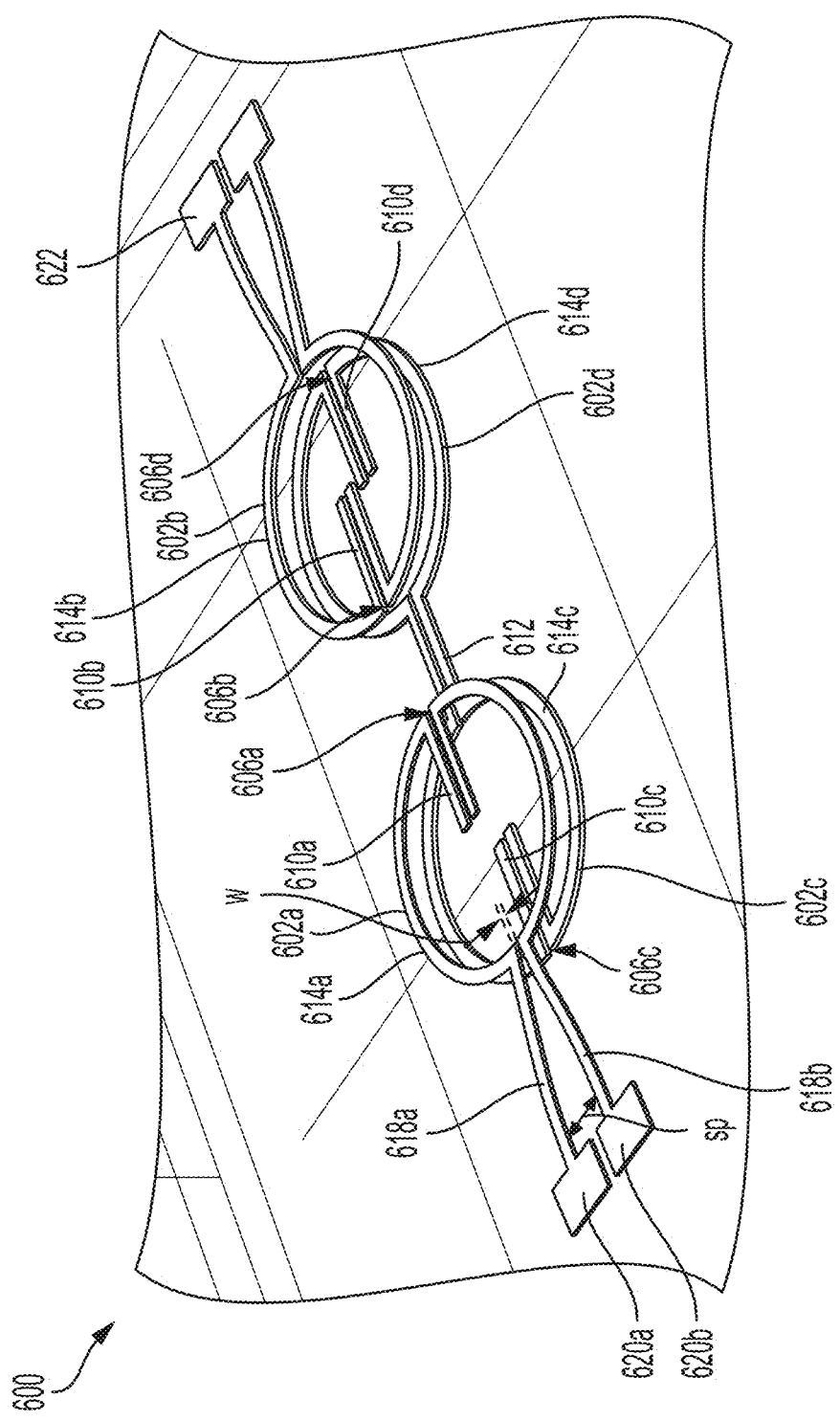
FIG. 6A is a simplified perspective view of an integrated isolator device having a back-to-back configuration, according to some embodiments.

FIG. 6A depicts an integrated isolator device 600, which may include a first isolator component 614a coupled to a first circuit (e.g., transmitter 104) operating at a first voltage domain. The integrated isolator device 600 may include a second isolator component 614b coupled to a second circuit (e.g., receiver 106) operating at a second voltage domain. The first isolator component 614a and the second isolator component 614b may be galvanically isolated from each other.

The first isolator component 614a may include a first inductive loop 602a and a first capacitor 610a. The first inductive loop 602a may include a first slit 606a. The first capacitor 610a may be integrally formed at the first slit 606a. The first inductive loop 602a may include two arcs. Two electrodes of the first capacitor 610a may extend from respective arcs, which may be coupled to respective pads 620a and 620b through respective traces 618a and 618b. The pads 620a and 620b may be coupled to the first circuit (e.g., transmitter 104). The first capacitor 610a may extend from the first slit 606a in a first direction, for example, pointing to an opening between the two arcs of the first inductive loop 602a. The traces 618a and 618b may extend from the opening between the two arcs to the respective pads 620a and 620b. It should be appreciated that the traces 618a and 618b are different from the two electrodes of the two electrodes of the first capacitor 610. For example, the traces 618a and 618b may be spaced from each other by a distance sp at an end coupled to the pads 620a and 620b. The distance sp may be configured to meet layout design rules that prevent the two pads 620a and 620b from shorting together. The distance sp may be larger than a slit's width w.

The second isolator component 614b includes a second inductive loop 602b and a second capacitor 610b. The second inductive loop 602b may include a second slit 606b. The second capacitor 610b may be integrally formed at the second slit 606b. The second inductive loop 602b may include two arcs. Two electrodes of the second capacitor 610b may extend from respective arcs, which may be coupled to respective pads 622 through respective traces. The pads 622 may be coupled to the second circuit (e.g., receiver 106). The second capacitor 610b may extend from the second slit 606a in a second direction opposite the first direction, for example, pointing to an opening between the two arcs of the second inductive loop 602b.

The first isolator component 614a and the second isolator component 614b may be inductively coupled to each other through third and fourth isolator components 614c and 614d, which may be electrically shorted together. The first isolator component 614a may at least partially overlap with the third isolator component 614c. The second isolator component 614b may at least partially overlap with the fourth isolator component 614d. Although the first isolator component 614a and the second isolator component 614b are inductively coupled to each other through two isolator components in the illustrated example in FIG. 6A, it should be appreciated that the first isolator component 614a and the second isolator component 614b may be inductively coupled to each other through more than two isolator components so as to, for example, achieve a higher isolation rating with the cumulative isolation properties of the increased number of isolator components.

Figure 6B:
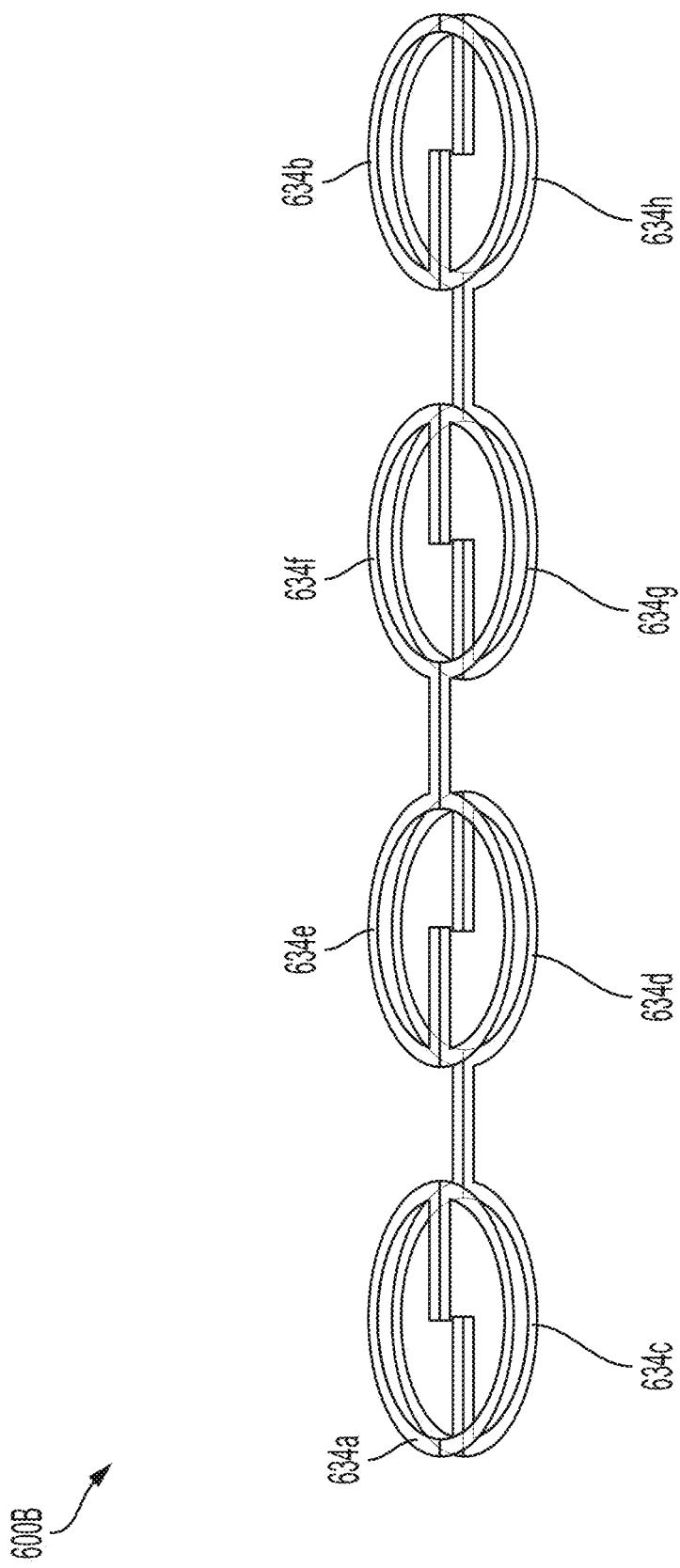
FIG. 6B is a simplified perspective view of an integrated isolator device having a back-to-back configuration, according to some embodiments.

FIG. 6B depicts an integrated isolator device 600B, which may include a first isolator component 634a and a second isolator component 634b. In the illustrated example, the first isolator component 634a and the second isolator component 634b are inductively coupled to each other through six isolator components 634c-634h. The isolator components 634c and 634d are electrically shorted together, and electrically isolated from the other isolator components 634a, 634b, 634e-634h. The isolator components 634e and 634f are electrically shorted together, and electrically isolated from the other isolator components 634a-634d, 634g, 634h. The isolator components 634g and 634h are electrically shorted together, and electrically isolated from the other isolator components 634a-634f.

Referring back to FIG. 6A, the first isolator component 614a and the second isolator component 614b may be disposed in a first plane on a substrate. The third isolator component 614c and the fourth isolator component 614d may be disposed in a second plane on the substrate. The third isolator component 614c and the fourth isolator component 614d may be electrically shorted together through, for example, one or more conductive traces 612. The third isolator component 614c and the fourth isolator component 614d may be electrically isolated from the first and second isolator components 614a and 614b. Although the first plane is above the second plane in the illustrated example, it should be appreciated that the first plane may be below the second plane in some embodiments. Although the integrated isolator device 600 includes isolator components fabricated on a single substrate as illustrated, it should be appreciated that the integrated isolator device 600 may include isolator components fabricated on different substrates and coupled together through, for example, bonding technologies. For example, the first and third isolator components 614a and 614c may be fabricated on one substrate, and the second and fourth isolator components 614b and 614d may be fabricated on another substrate. The third and fourth isolator components 614c and 614d may be electrically shorted together through bonding wires.

The third isolator component 614c may include a third inductive loop 602c and a third capacitor 610c. The third inductive loop 602c may include a third slit 606c. The third capacitor 610c may be integrally formed at the third slit 606c. The third inductive loop 602c may include two arcs. Two electrodes of the third capacitor 610c may extend from respective arcs. The third capacitor 610c may extend from the third slit 606c in the second direction opposite the first direction.

The fourth isolator component 614d may include a fourth inductive loop 602d and a fourth capacitor 610d. The fourth inductive loop 602d may include a fourth slit 606d. The fourth capacitor 610d may be integrally formed at the fourth slit 606d. The fourth inductive loop 602d may include two arcs. Two electrodes of the fourth capacitor 610d may extend from respective arcs, which may be respectively coupled to the two arcs of the third inductive loops 602c through the one or more conductive traces 612. The fourth capacitor 610c may extend from the fourth slit 606d in the first direction.

Figure 7A:
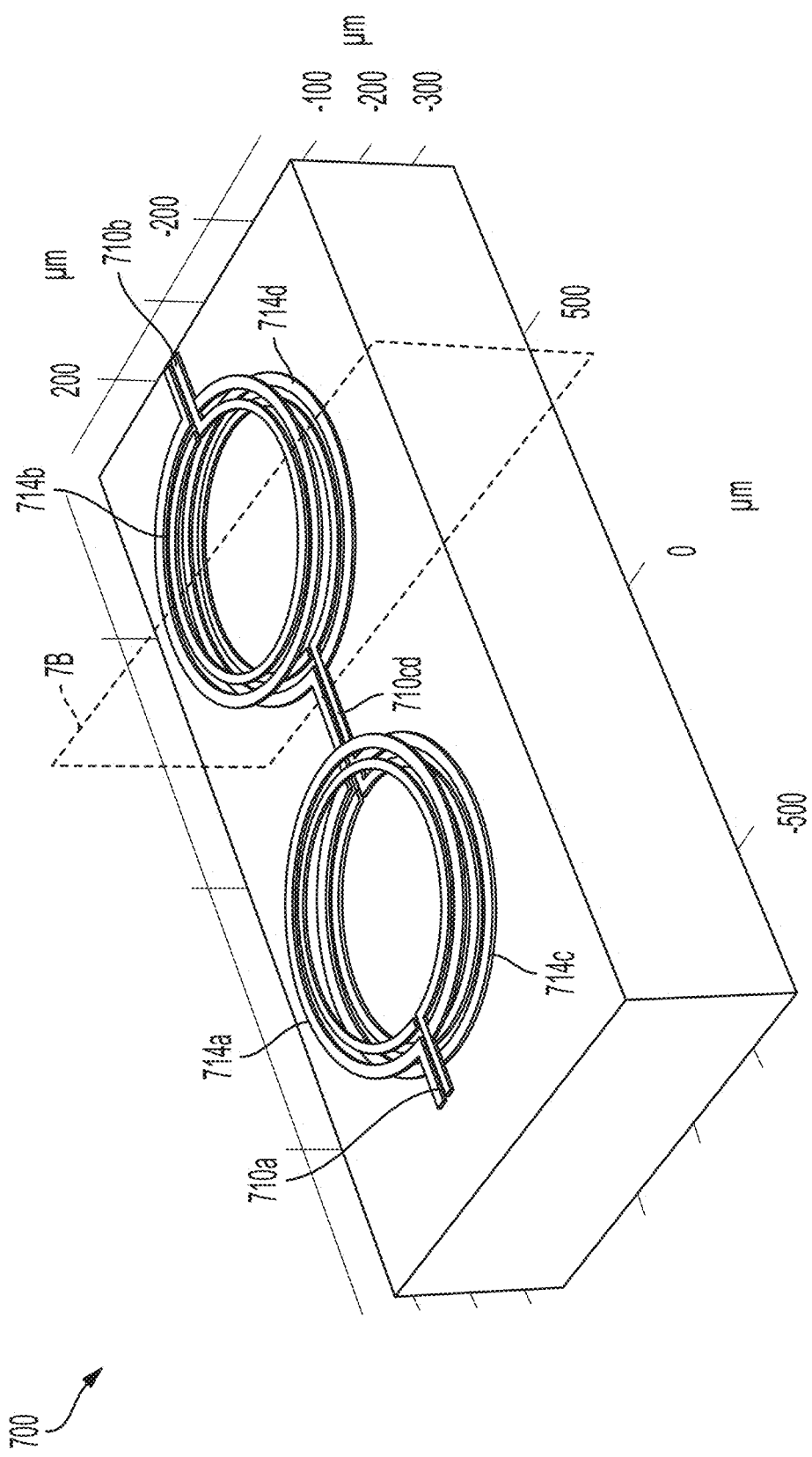
FIG. 7A is a simplified perspective view of an integrated isolator device having a back-to-back configuration, according to some embodiments.

FIG. 7A depicts an integrated isolator device 700 having a back-to-back configuration, according to some embodiments. The integrated isolator device 700 may include a first isolator component 714a configured to be coupled to a first circuit (e.g., transmitter 104) and a second isolator component 714b configured to be coupled to a second circuit (e.g., receiver 106). The first and second isolator components 714a and 714b may be galvanically isolated from each other, and inductively coupled to each other through third and fourth isolator components 714c and 714d.

In the illustrated example, each of the isolator components 714a-714d has a configuration similar to the isolator component 302B (FIG. 3B). The first and second isolator components 714a and 714b include first and second capacitors 710a and 710b respectively. The first and second capacitors 710a and 710b extend in opposite directions and away from respective inductive loops. The third and fourth isolator components 714c and 714d are electrically shorted together through electrodes of a third capacitor 710cd. It should be appreciated that interconnections such as traces and pads are not shown for purpose of simple illustration.

Figure 7B:
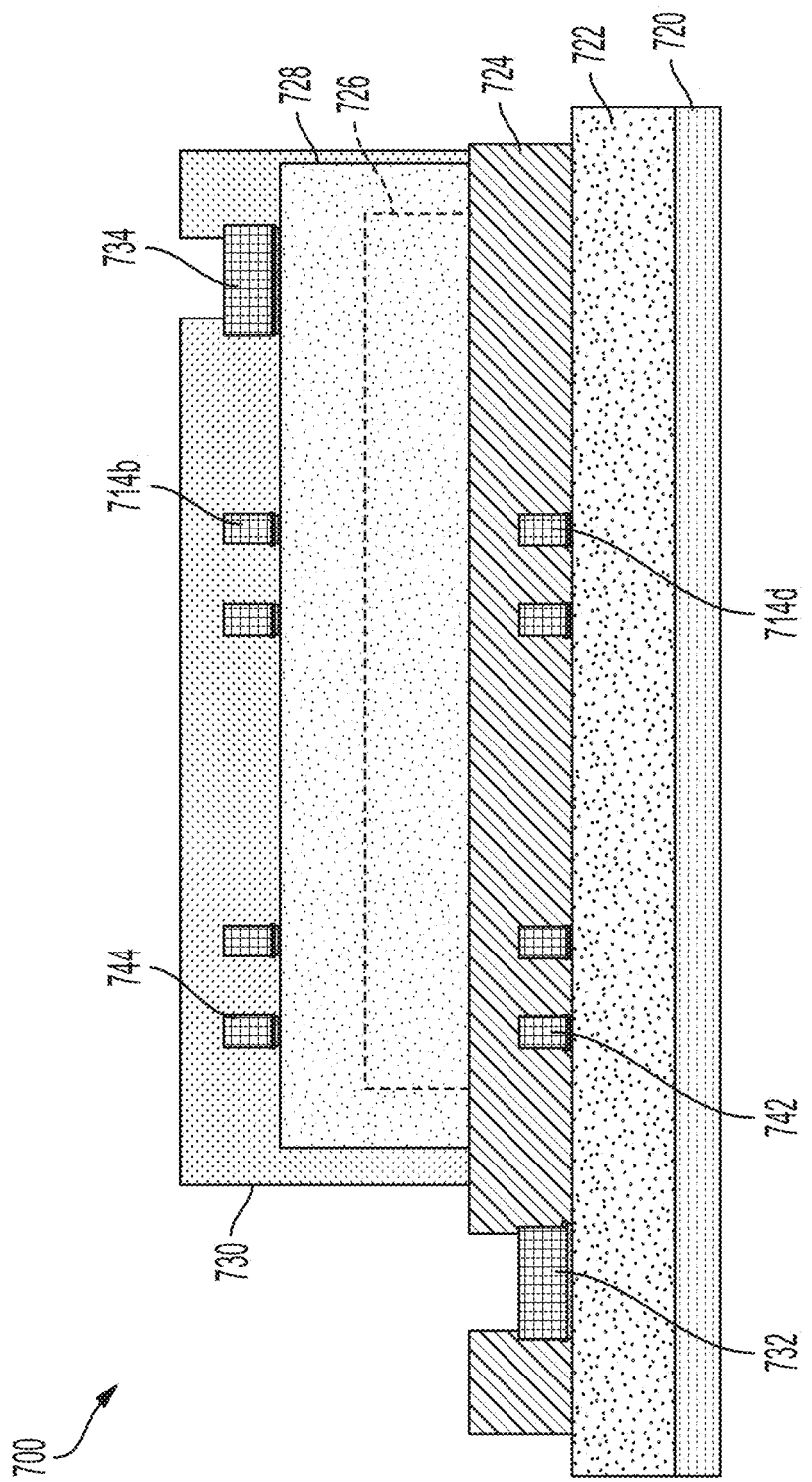
FIG. 7B is a simplified cross-sectional view of the integrated isolator device of FIG. 7A across a plane marked 7B, according to some embodiments.

FIG. 7B depicts a cross-sectional view of the integrated isolator device 700 across a plane marked 7B in FIG. 7A, according to some embodiments. The integrated isolator device 700 may be fabricated on a substrate 720 and isolated from the substrate 720 by an insulating layer 722. The insulating layer 722 may have a suitable thickness, such as between 3 μm and 10 μm (e.g., 5.5 μm). The fourth isolator component 714d may be in a first metallization layer 742 and covered by an insulating layer 724. The insulating layer 724 may have a suitable thickness, such as between 3 μm and 10 μm (e.g., 5 μm). One or more pads 732 may be in the first metallization layer 742 and configured to provide access to the fourth isolator component. The first metallization layer 742 may be formed of a suitable material, such as gold, and may have a suitable thickness, such as between 2 μm and 9 μm (e.g., 4 μm). The second isolator component 714b may be in a second metallization layer 744 and covered by an insulating layer 730. One or more pads 734 may be in the second metallization layer 744 and configured to provide access to the second isolator component. The second metallization layer 744 may be formed of a suitable material, which may be similar to or different from the first metallization layer 742. The second metallization layer 744 may have a suitable thickness, which may be similar to or different from the first metallization layer 742. The second and fourth isolator components 714b and 714d may be isolated from each other by one or more inductive layers. In the illustrated example, the second and fourth isolator components 714b and 714d may be isolated from each other by two insulating layers 726 and 728. The insulating layers 726 and 728 may have a suitable combined thickness, such as between 20 μm and 500 μm (e.g., 50 μm). The insulating layers 726 and 728 may have similar or different thicknesses. Although examples of materials with thicknesses are illustrated in FIG. 7B, it should be appreciated that the examples are not limiting.

Figure 8:
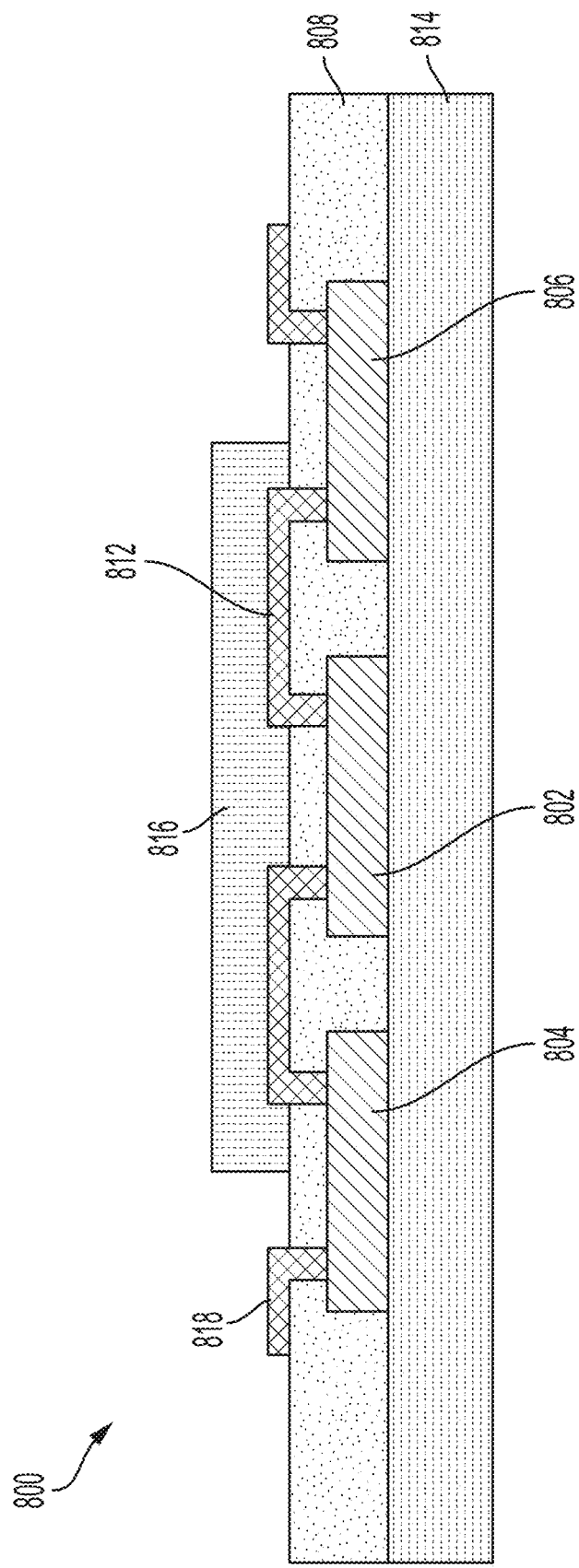
FIG. 8 is a cross-sectional view of a system including an integrated isolator device, according to some embodiments.

The integrated isolator devices described herein may be compatible to various fabrication processes including, for example, micro-fabrication and printed circuit board (PCB) manufacture processes. It should be appreciated that an inductive loop described herein enables the use of various fabrication processes because inductive loops described herein are simpler than conventional isolators (e.g., spiral inductors) and thus can be fabricated with technologies such as PCB processes that have coarse design rules. FIG. 8 depicts an isolator system 800 fabricated using a redistribution layer (RDL) process, according to some embodiments. FIGS. 9A-9B depict an isolator system 900 fabricated using a device in a packaging process, according to some embodiments.

FIG. 8 depicts a cross-sectional view of the isolator system 800 in accordance with some embodiments. The isolator system 800 may include dies 802, 804 and 806 attached to a substrate 814 (e.g., a wafer). The first die 802 may include an integrated isolator device as described herein. The second die 804 may include a first circuit operating at a first voltage domain (e.g., transmitter 104). The third die 806 may include a second circuit operating at a second voltage domain (e.g., receiver 106). The dies may be isolated from each other by an insulating layer 808, and coupled to each other through a redistribution layer 812. The insulating layer 808 may be formed of a suitable material such as laminate. The redistribution layer 812 may be formed of a suitable material, such as gold. At least a portion of the redistribution layer 812 may be covered by an insulating layer 816 such as polyimide. One or more pads 818 may be in the redistribution layer 812.

FIG. 9A depicts a top view of the isolator system 900 in accordance with some embodiments. FIG. 9B depicts a cross-sectional view of the system 900 along a line marked 9B in FIG. 9A in accordance with some embodiments. The isolator system 900 may include an integrated isolator device 902 in accordance with any embodiments described herein. The integrated isolator device 902 may be formed in a printed circuit board 910. The integrated isolator device 902 may include a first isolator component 902a formed in a first metallization layer of the PCB, and a second isolator component 902b formed in a second metallization layer of the PCB and galvanically isolated from the first isolator component 902a. The isolator system 900 may include dies 904 and 906. The first die 904 may include a first circuit operating at a first voltage domain (e.g., transmitter 104). The second die 906 may include a second circuit operating at a second voltage domain (e.g., receiver 106). The first and second dies 904 and 906 may be coupled to the integrated isolator device 902 through, for example, solder balls and/or one or more of PCB metallization layers. The first and second dies 904 and 906 may be covered by a molding layer 908 formed of a suitable material such as polyimide.

Figure 10:
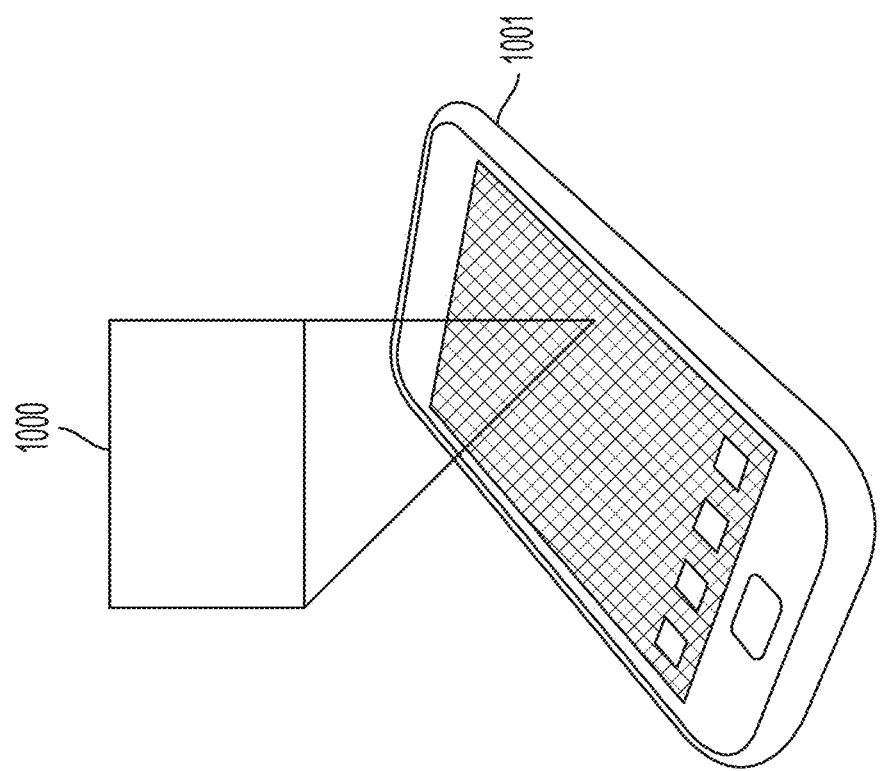
FIG. 10 is a schematic diagram illustrating a portable electronic device incorporating an integrated isolator device, according to some embodiments.

Integrated isolator devices of the types described herein may be used in various devices and settings. For example, the integrated isolator devices may be used for isolation in medical equipment systems, industrial equipment systems, physical measurement systems, or personal or portable electronic equipment. FIG. 10 is a schematic diagram showing a non-limiting application of an integrated isolator system in a portable electronic device setting, according to some embodiments. An integrated isolator system 1000 may be used in a portable electronic device 1001 to transmit power across an isolation barrier with both high transfer efficiency and high isolation rating at high operating frequencies. The portable electronic device 1001 may be a smartphone, personal digital assistant (PDA), tablet or other portable device. Other such devices may make use of integrated isolator systems of the types described herein.

While FIG. 10 illustrates an example of a portable electronic device 1001 incorporating aspects of the present application, other uses are possible. For example, one or more integrated isolator systems 1000 may be employed in an automobile or a medical instrument. Various embodiments of the present application may be implemented to provide high transfer efficiency and high isolation rating at high operating frequencies.

Various embodiments have been described as providing isolators with insulating materials, which may be with different permittivity values. The specific permittivity values of the materials are not limiting, as various materials with relatively higher and lower permittivity values may be used. However, non-limiting examples are now provided. Non-limiting examples of the higher permittivity dielectric materials that may be used around arcs of the inductive loops, such as insulating layers 724 and 730, include silicon nitride (SiN), aluminum oxide ($Al_2O_3$), tantalum pentoxide ($Ta_2O_5$), strontium titanate ($SrTiO_3$), bismuth ferrite ($BiFeO_3$), silicon dioxide ($SiO_2$), and barium strontium titinate (BST).

A non-limiting example of the lower permittivity dielectric materials that may be used in embodiments of the dielectric regions described herein, such as lower permittivity dielectric regions 726 and 728, includes polyimide.

Examples of conductive materials that may be used to form isolator components (e.g., inductive loops, capacitors, traces) in embodiments of the integrated isolator device described herein include gold and copper, or any other suitable conductive material.

Examples of substrate materials that may be used in embodiments of the integrated isolator device described herein, such as substrates 204 and 720, include silicon, quartz, and laminate. In some embodiments, the substrate of the integrated isolator device may be an insulating substrate.

The integrated isolator devices described herein may be used in various applications (e.g., industrial, medical, consumer). For example, data transfer and/or power transfer between galvanically isolated systems may be accomplished with the integrated isolator devices described herein. As one example, medical equipment in a room in which a medical procedure is being performed may be galvanically isolated from a control system in a control room. For instance, a piece of medical imaging equipment and/or monitors in the room in which the procedure is being performed may be isolated from a system controlling operation of the imaging equipment and/or display. The isolator may be an integrated isolator device and/or system of any of the types described herein, and the isolated signal path may be analog or digital.

As another example, industrial equipment may be isolated from a control system controlling the equipment. For example, high wattage motors may be isolated from control systems controlling their operation by integrated isolator device of the types described herein. The control systems may operate at a lower wattage than the high wattage motors used by the industrial equipment. The isolator may be disposed on a circuit board on which various circuit components connected to the motors and/or control equipment are included.

Other uses of the integrated isolator devices described herein are also possible, as those examples described are non-limiting.

The terms "approximately" and "about" may be used to mean within ±20% of a target value in some embodiments, within ±10% of a target value in some embodiments, within ±5% of a target value in some embodiments, and yet within ±2% of a target value in some embodiments. The terms "approximately" and "about" may include the target value.

What is claimed is:
1. An integrated isolator device comprising:
a substrate;
a first inductive loop on the substrate and having a first slit;
a first capacitor comprising first and second electrodes extending from the first slit;
a second inductive loop on the substrate and having a second slit, the second inductive loop being galvanically isolated from the first inductive loop; and
a second capacitor comprising third and fourth electrodes extending from the second slit.

2. The integrated isolator device of claim 1, wherein:
the first and second capacitors are sized such that the first and second inductive loops can operate in resonance at a frequency not less than 1 GHz.

3. The integrated isolator device of claim 1, wherein the first and second electrodes of the first capacitor extend for a length for the first and second inductive loops to operate in resonance at a frequency not less than 1 GHz.

4. The integrated isolator device of claim 1, wherein:
the first capacitor extends from the first slit in a first direction, and
the second capacitor extends from the second slit in a second direction different from the first direction.

5. The integrated isolator device of claim 1, wherein the first and second electrodes of the first capacitor are substantially parallel to each other.

6. The integrated isolator device of claim 1, wherein the first and second electrodes of the first capacitor are interleaved with each other.

7. The integrated isolator device of claim 1, wherein the first inductive loop and the first and second electrodes of the first capacitor are in a first metallization layer.

8. The integrated isolator device of claim 7, wherein the second inductive loop and the third and fourth electrodes of the second capacitor are in a second metallization layer different from the first metallization layer.

9. The integrated isolator device of claim 7, wherein the second inductive loop and the third and fourth electrodes of the second capacitor are in the first metallization layer.

10. The integrated isolator device of claim 1, wherein:
the first inductive loop comprises a first arc having a first radius and a second arc having a second radius different from the first radius, and
the first and second arcs are concentric.

11. The integrated isolator device of claim 10, wherein:
the first electrode of the first capacitor extends from the first arc, and
the second electrode of the first capacitor extends from the second arc.

12. An integrated isolator device comprising:
a substrate;
first and second inductive loops on the substrate and having first and second slits respectively;
a first capacitor extending from the first slit in a first direction;
a second capacitor extending from the second slit in a second direction opposite to the first direction;
third and fourth inductive loops on the substrate, the third and fourth inductive loops being electrically coupled to each other and having third and fourth slits respectively;
a third capacitor extending from the third slit in the second direction; and
a fourth capacitor extending from the fourth slit in the first direction.

13. The integrated isolator device of claim 12, wherein the first inductive loop is galvanically isolated from the second inductive loop.

14. The integrated isolator device of claim 12, wherein the third inductive loop at least partially overlaps with the first inductive loop.

15. The integrated isolator device of claim 12, wherein:
the first inductive loop comprises a first arc having a first radius and a second arc having a second radius different from the first radius, and
the first and second arcs are concentric.

16. The integrated isolator device of claim 15, wherein the first capacitor has a first electrode extending from the first arc, and a second electrode extending from the second arc.

17. A system comprising:
an integrated isolator device comprising:
a first inductive loop having a first slit,
a second inductive loop having a second slit, the second inductive loop being galvanically isolated from the first inductive loop, and
first and second capacitors extending from the first and second slits respectively;
a transmitter coupled to the first inductive loop and configured to operate in a first voltage domain; and
a receiver coupled to the second inductive loop and configured to operate in a second voltage domain different from the first voltage domain.

18. The system of claim 17, comprising:
a substrate, wherein the integrated isolator device, transmitter, and receiver are on the substrate and coupled through one or more redistribution layers.

19. The system of claim 17, comprising:
a printed circuit board,
the first inductive loop of the integrated isolator device is in a first metallization layer of the printed circuit board, and
the second inductive loop of the integrated isolator device is in a second metallization layer of the printed circuit board.

20. The system of claim 19, wherein the transmitter is an integrated circuit (IC) chip mounted on the printed circuit board.

* * * * *